US006646100B2

(12) United States Patent
Hofmann et al.

(10) Patent No.: US 6,646,100 B2
(45) Date of Patent: Nov. 11, 2003

(54) ALIPHATIC POLYCARBONATE HOMO-AND CO-POLYMERS PRODUCED BY DMC CATALYSIS AND THE PROCESS FOR THEIR PRODUCTION

(75) Inventors: Jörg Hofmann, Krefeld (DE); Walter Schäfer, Leichlingen (DE); Christian Steinlein, Ratingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/208,536

(22) Filed: Jul. 30, 2002

(65) Prior Publication Data

US 2003/0032761 A1 Feb. 13, 2003

(30) Foreign Application Priority Data

Aug. 3, 2001 (DE) .......................................... 101 38 216

(51) Int. Cl.[7] .............................................. C08G 64/00
(52) U.S. Cl. ........................ 528/196; 528/198; 521/155; 524/321
(58) Field of Search ................................. 528/196, 198, 528/271, 272, 354; 524/321; 521/155

(56) References Cited

U.S. PATENT DOCUMENTS

| | | | |
|---|---|---|---|
| 3,278,457 A | 10/1966 | Milgrom | 260/2 |
| 3,404,109 A | 10/1968 | Milgrom | 260/611 |
| 3,538,048 A | 11/1970 | Taylor et al. | 260/45.95 |
| 3,829,505 A | 8/1974 | Herold | 260/611 B |
| 3,941,849 A | 3/1976 | Herold | 260/607 A |
| 4,826,887 A | 5/1989 | Kuyper et al. | 521/189 |
| 4,879,367 A | * 11/1989 | Piejko et al. | 528/371 |
| 5,032,671 A | 7/1991 | Harper | 528/357 |
| 5,115,045 A | 5/1992 | Gillis et al. | 525/420 |
| 5,145,883 A | 9/1992 | Saito et al. | 521/172 |
| 5,158,922 A | 10/1992 | Hinney et al. | 502/175 |
| 5,470,813 A | 11/1995 | Le-Khac | 502/175 |
| 5,482,908 A | 1/1996 | Le-Khac | 502/156 |
| 5,536,883 A | 7/1996 | Le-Khac | 568/620 |
| 5,545,601 A | 8/1996 | Le-Khac | 502/156 |
| 5,627,120 A | 5/1997 | Le-Khac | 502/156 |
| 5,637,673 A | 6/1997 | Le-Khac | 528/405 |
| 5,712,216 A | 1/1998 | Le-Khac et al. | 502/175 |
| 5,714,428 A | 2/1998 | Le-Khac | 502/159 |
| 6,018,017 A | 1/2000 | Le-Khac | 528/421 |

FOREIGN PATENT DOCUMENTS

| | | | |
|---|---|---|---|
| JP | 64 33125 | * | 2/1989 |
| WO | 00/47649 | | 8/2000 |

* cited by examiner

*Primary Examiner*—Terressa M. Boykin
(74) *Attorney, Agent, or Firm*—Joseph C. Gil; Lyndanne M. Whalen

(57) ABSTRACT

Aliphatic polycarbonate homo- and co-polymers are obtained by ring-opening homo- or co-polymerization of cyclic carbonates by DMC catalysis. These polymers are useful in the production of polyurethanes.

10 Claims, No Drawings

ALIPHATIC POLYCARBONATE HOMO- AND CO-POLYMERS PRODUCED BY DMC CATALYSIS AND THE PROCESS FOR THEIR PRODUCTION

BACKGROUND OF THE INVENTION

The invention relates to aliphatic polycarbonate homo- and co-polymers which are obtained by ring-opening homo- or co-polymerization of cyclic carbonates by DMC catalysis.

Double metal cyanide (DMC) catalysts useful for the ring-opening polymerization of oxygen-containing, cyclic monomers have been known for a long time. DMC catalysts are of particular commercial interest for the production of polyether polyols by polyaddition of epoxides to starter compounds exhibiting active hydrogen atoms (See, e.g., U.S. Pat. Nos. 3,404,109; 3,829,505; 3,941,849 and 5,158,922.) because the use of a DMC catalyst reduces the proportion of monofunctional polyethers with terminal double bonds (so-called "mono-ols") compared to polyether polyols produced using conventional alkaline catalysts. Moreover, improved, highly active DMC catalysts, which are described, e.g., in U.S. Pat. No. 5,470,813; EP-A 700 949; EP-A 743 093; EP-A 761 708; WO 97/40086; WO 98/16310 and WO 00/47649, possess extraordinarily high activity and permit polyether polyol production at very low catalyst concentrations (25 ppm or less). Consequently, it is no longer necessary to separate the catalyst from the finished product. In addition, DMC catalysts also make possible the homo- and co-polymerization of other oxygen-containing, cyclic monomers, such as oxetanes, (U.S. Pat. Nos. 3,278,457 and 3,404,109), cyclic anhydrides (U.S. Pat. Nos. 5,145,883 and 3,538,043) and lactones (U.S. Pat. No. 5,032,671).

Aliphatic polycarbonate homo- and co-polymers are suitable as additives for thermoplastic systems. Moreover, aliphatic, OH-functional polycarbonates are widely used as a hydroxyl component for building up polyurethanes and polyurethane-urea elastomers. Common methods for the production of aliphatic polycarbonates are transesterification of a diol with a dialkyl carbonate from a short-chain alcohol, with a dioxolanone or with a diphenyl carbonate. These reactions are accelerated by catalysts, particularly alkali, tin and titanium compounds (See, e.g., Kunststoffhandbuch, vol. 3/1 Polycarbonate, Hanser Verlag, Munich, 1992, p. 118f.).

SUMMARY OF THE INVENTION

It has now been found that aliphatic polycarbonate homo- and co-polymers can be obtained by ring-opening homo- or co-polymerization of a cyclic carbonate by DMC catalysis.

DETAILED DESCRIPTION OF THE INVENTION

The present invention relates to aliphatic polycarbonate homo- and co-polymers, which are obtained entirely or partly by ring-opening homo- or co-polymerization of cyclic carbonates by DMC catalysis.

Suitable cyclic carbonates useful in the practice of the present invention may be represented by the general formula (I.) or (II.)

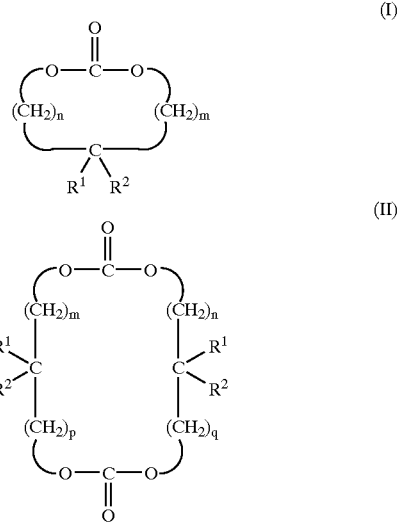

in which
m, n, p and q, independently of one another, each represents 0, 1, 2, 3, 4, or 6 and
$R^1$ and $R^2$ represent H, a $C_{1-6}$ alkyl, a $C_{3-6}$ alkenyl, or a $C_{1-6}$ alk(en)yloxy-$C_{1-6}$ alkyl group, particularly H, $CH_3$ and $C_2H_5$.

Preferred cyclic carbonates represented by formula (I) or (II) include: trimethylene glycol carbonate, neopentyl glycol carbonate, 1,4-butanediol carbonate and dimeric carbonates of pentanediol or of hexanediol. Particularly preferred are 6-membered ring carbonates, particularly neopentyl glycol carbonate.

Suitable DMC catalysts are known and are described in detail in the disclosures discussed in the Background of the Invention. Improved, highly active DMC catalysts, such as those described in U.S. Pat. No. 5,470,813; EP-A 700 949; EP-A 743 093; EP-A 761 708; WO 97/40086; WO 98/16310 and WO 00/47649, are preferably used. The highly active DMC catalysts described in EP-A 700 949, which, in addition to a double metal cyanide compound (e.g. zinc hexacyano-cobaltate(III)) and an organic complex ligand (e.g. tert.-butanol), also contain a polyether with a number-average molecular weight of more than 500 g/mole, are typical examples of suitable catalysts.

The DMC-catalyzed, ring-opening homo- or co-polymerization of the cyclic carbonate generally takes place at temperatures of from 20 to 200° C., preferably in the range of from 40 to 180° C., most preferably at temperatures of from 80 to 160° C. The reaction can be conducted under a total pressure of from 0.001 to 20 bar. The polymerization can be performed in substance or in an inert, organic solvent, such as toluene or tetrohydrofuran (THF). If used, the quantity of solvent is generally from 10 to 30 wt. %, based on the total amount of polymer to be produced.

The catalyst concentration is generally in the range of from 0.0005 wt. % to 1 wt. %, preferably in the range of from 0.001 wt. % to 0.1 wt. %, most preferably in the range of from 0.001 to 0.05 wt. %, based on the total amount of polymer to be produced.

The polymerization can be performed continuously or non-continuously, e.g. in a batch or semi-batch process.

The DMC-catalyzed, ring-opening homo- or co-polymerization of the cyclic carbonate is optionally performed in the presence of one or more starter compounds exhibiting active hydrogen atoms. In this way, OH-functionalized aliphatic polycarbonate homo- and co-polymers that are suitable as polyol components for building up polyurethane systems can be produced.

Compounds with molecular weights of from 18 to 10,000 g/mole and having from 1 to 8 hydroxyl groups are preferably used as starter compounds exhibiting active hydrogen atoms. Examples of such compounds include: water, ethanol, butanol, ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, degraded starch, polyether polyols and polyester polyols.

The DMC-catalyzed, ring-opening polymerization of the cyclic carbonate can be performed as a homopolymerization, optionally in the presence of one or more starter compounds exhibiting active hydrogen atoms.

The DMC-catalyzed, ring-opening polymerization of the cyclic carbonates can also be performed as a co-polymerization, again optionally in the presence of one or more starter compounds exhibiting active hydrogen atoms. Both random co-polymerization and block co-polymerization are possible.

In random co-polymerization, the DMC-catalyzed, ring-opening polymerization of the cyclic carbonate is performed in the presence of one or more other monomers suitable for polymerization with a DMC catalyst. Particularly suitable for random co-polymerization with cyclic carbonates are: epoxides, particularly ethylene oxide, propylene oxide and butylene oxide and mixtures thereof; oxetanes; cyclic anhydrides, such as phthalic anhydride; cyclic esters, such as caprolactone; and lactides.

In the production of polycarbonate block co-polymers in accordance with the present invention, the aliphatic polycarbonate block is obtained by means of DMC-catalyzed, ring-opening polymerization of a cyclic carbonate. Preferred block co-polymers include: poly(ester-block-carbonate) co-polymers and poly(ether-block-carbonate) co-polymers, in which the ester or ether block can be obtained by any of the known processes or catalysts.

In a preferred embodiment of the process of the present invention, a polyether polyol is first produced by any of the known methods, e.g., by DMC-catalyzed polyaddition of an epoxide, (particularly propylene oxide and/or a propylene oxide/ethylene oxide mixture), to the starter compound exhibiting active hydrogen atoms (mentioned above). The polyether polyol containing the active DMC catalyst is then reacted with a cyclic carbonate in the manner according to the present invention, with ring-opening. In this reaction with the carbonate, secondary hydroxyl groups of the polyether polyol can be converted completely or partially into primary hydroxyl groups, which are more reactive with isocyanate groups. These poly(ether-carbonate) polyols are therefore of great interest for use in the production of polyurethanes.

Having thus described the invention, the following Examples are given as being illustrative thereof.

EXAMPLES

Example 1

In a heatable, flat-ground jar equipped with a stirrer and reflux condenser, 20 g of a polypropylene glycol starter compound (number-average molecular weight=1,000 g/mole) and 4 mg of DMC catalyst (containing zinc hexacyanocobaltate, tert.-butanol and polypropylene glycol with a number-average molecular weight of 1000 g/mole; described in EP-A 700 949) were placed under argon and heated to 105° C. 20 g of propylene oxide were then metered in continuously at 105° C. under normal pressure within 3 hours. When all of the propylene oxide had been added, 5.2 g of neopentyl glycol carbonate were added and stirring was then continued for 1 hour at 150° C. under normal pressure. Volatile components were then distilled off for 1 h at 150° C./1 mbar. The mixture was then cooled to ambient temperature.

A slightly yellowish, clear product was obtained. $^1$H- and $^{13}$C-NMR analysis showed that 28% of the secondary hydroxyl groups of the polypropylene glycol had reacted with neopentyl glycol carbonate, with ring opening, forming a primary hydroxyl group.

Example 2

In a heatable, flat-ground jar equipped with a stirrer and reflux condenser, 20 g of a polypropylene glycol starter compound (number-average molecular weight=1,000 g/mole) and 2 mg of the DMC catalyst used in Example 1 were placed under argon and heated to 105° C. 20 g of propylene oxide were then metered in continuously at 105° C. under normal pressure within 3 hours. When all of the propylene oxide had been added, 5.2 g of neopentyl glycol carbonate were added and stirring was then continued for 5 hours at 150° C. under normal pressure. Volatile components were then distilled off for 1 h at 150° C./1 mbar and the reaction mixture was then cooled to ambient temperature.

A yellowish, clear product was obtained. $^1$H- and $^{13}$C-NMR analysis showed that 47% of the secondary hydroxyl groups of the polypropylene glycol had reacted with neopentyl glycol carbonate, with ring opening, forming a primary hydroxyl group.

Example 3

In a heatable, flat-ground jar equipped with a stirrer and reflux condenser, 20 g of a polypropylene glycol starter compound (number-average molecular weight=1,000 g/mole) and 2 mg of the DMC catalyst used in Example 1 were placed under argon and heated to 105° C. 20 g of propylene oxide were then metered in continuously at 105° C. under normal pressure over 3 hours. When all the propylene oxide had been added, 15.6 g of neopentyl glycol carbonate were added and stirring was then continued for 1 hour at 150° C. under normal pressure. Volatile components were then distilled off for 1 h at 150° C./1 mbar and the reaction mixture was then cooled to ambient temperature.

A yellowish and (because of unreacted neopentyl glycol carbonate) cloudy product was obtained. $^1$H- and $^{13}$C-NMR analysis showed that 70% of the secondary hydroxyl groups of the polypropylene glycol had reacted with neopentyl glycol carbonate, with ring opening, forming a primary hydroxyl group.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aliphatic polycarbonate polymer produced by ring-opening polymerization of a cyclic carbonate in the presence of a DMC catalyst.

2. The aliphatic polycarbonate polymer of claim 1 in which the cyclic carbonate is represented by general formula (I) or (II):

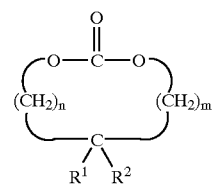
(I)

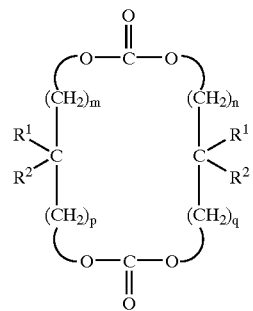
(II)

in which m, n, p and q, independently of one another, represent 0, 1, 2, 3, 4, 5 or 6 and $R^1$ and $R^2$ represent H, a $C_{1-6}$ alkyl, a $C_{3-6}$ alkenyl, or a $C_{1-6}$ alk(en)yloxy-$C_{1-6}$ alkyl group.

3. The aliphatic polycarbonate polymer of claim 1 in which the cyclic carbonate is neopentyl glycol carbonate.

4. The aliphatic polycarbonate polymer of claim 1 in which the DMC catalyst used to produce the polymer contains zinc hexacyanocobaltate(III).

5. The aliphatic polycarbonate polymer of claim 1 in which the DMC catalyst used to produce the polymer contains tert.-butanol.

6. The aliphatic polycarbonate polymer of claim 1 in which the ring-opening polymerization is performed in the presence of one or more starter compounds exhibiting active hydrogen atoms.

7. A process for the production of a polyol comprising ring-opening a cyclic carbonate in the presence of a DMC catalyst.

8. A process for the production of a poly(ether-carbonate) polyol comprising
   a) producing a polyether polyol by polyaddition of an epoxide to a starter compound exhibiting active hydrogen atoms in the presence of a DMC catalyst and
   b) reacting the polyether polyol containing the active DMC catalyst with a cyclic carbonate under conditions such that ring-opening in the cyclic carbonate occurs.

9. The poly(ether-carbonate) polyol produced by the process of claim 8.

10. A polyurethane produced by reacting the polyol of claim 9 with an isocyanate.

* * * * *